(12) United States Patent
Sasaki et al.

(10) Patent No.: US 12,330,712 B2
(45) Date of Patent: Jun. 17, 2025

(54) VEHICLE HOOD HINGE

(71) Applicant: HONDA MOTOR CO., LTD., Tokyo (JP)

(72) Inventors: Kazutada Sasaki, Wako (JP); Chisato Suetsugu, Wako (JP); Shin Saeki, Tokyo (JP); Thomas Wood, Penetanguishene (CA)

(73) Assignee: HONDA MOTOR CO., LTD., Tokyo (JP)

( * ) Notice: Subject to any disclaimer, the term of this patent is extended or adjusted under 35 U.S.C. 154(b) by 334 days.

(21) Appl. No.: 18/174,894

(22) Filed: Feb. 27, 2023

(65) Prior Publication Data

US 2023/0294775 A1  Sep. 21, 2023

(30) Foreign Application Priority Data

Mar. 17, 2022  (JP) .................. 2022-042940

(51) Int. Cl.
*B62D 25/12* (2006.01)
*B60R 21/38* (2011.01)
*E05C 17/52* (2006.01)

(52) U.S. Cl.
CPC .............. *B62D 25/12* (2013.01); *B60R 21/38* (2013.01); *E05C 17/52* (2013.01)

(58) Field of Classification Search
CPC .......... B62D 25/12; B60R 21/38; E05C 17/52
See application file for complete search history.

(56) References Cited

U.S. PATENT DOCUMENTS

| | | | | |
|---|---|---|---|---|
| 6,513,617 B2* | 2/2003 | Sasaki | ...................... | B60R 21/38 296/187.05 |
| 6,554,093 B2* | 4/2003 | Sasaki | ...................... | B60R 21/38 180/274 |
| 9,085,282 B2* | 7/2015 | Agell Merino | ......... | B60R 21/38 |
| 9,366,066 B2* | 6/2016 | Hwang | ...................... | G06F 1/16 |
| 9,764,711 B2* | 9/2017 | Narita | ...................... | E05F 3/16 |
| 10,336,291 B2* | 7/2019 | Schabenberger | ...... | B62D 25/12 |
| 11,383,672 B2* | 7/2022 | Wood | ................... | B62D 25/105 |
| 11,584,331 B2* | 2/2023 | Sasaki | ...................... | E05D 15/48 |
| 2010/0024162 A1* | 2/2010 | Walz | ...................... | E05B 83/16 16/233 |

(Continued)

FOREIGN PATENT DOCUMENTS

DE        10136340 A1 *  3/2002  ............. B60R 21/38
JP     H10258774 A  *  9/1998

(Continued)

*Primary Examiner* — Steve Clemmons
(74) *Attorney, Agent, or Firm* — Rankin, Hill & Clark LLP (57) ABSTRACT

A vehicle hood hinge includes: a lower hinge configured to be fixed to a vehicle body; an upper hinge configured to be fixed to, and supported by, a hood so as to be movable relative to the lower hinge, the hood being configured to open or close an opening formed in an upper surface of the vehicle body; a link mechanism linking the lower hinge with the upper hinge; and a load receiving member configured to support a load of the hood, wherein the link mechanism is configured to switch between pivoting to cause the hood to be pivoted about an axis through the lower hinge and lifting to lift the hood, and the load receiving member is configured to receive, on a front-rear side thereof, the load of the hood lifted through the lifting, to restrict the hood from lowering.

9 Claims, 8 Drawing Sheets

(56) References Cited

U.S. PATENT DOCUMENTS

| | | | |
|---|---|---|---|
| 2014/0182962 A1* | 7/2014 | McIntyre | B60R 21/38 180/274 |
| 2019/0383074 A1* | 12/2019 | Schabenberger | E05D 11/00 |
| 2020/0207304 A1* | 7/2020 | Sasaki | B60R 21/38 |
| 2021/0300295 A1 | 9/2021 | Sasaki et al. | |

FOREIGN PATENT DOCUMENTS

| | | | |
|---|---|---|---|
| JP | 2004330911 A | * | 11/2004 |
| JP | 2021-154863 A | | 10/2021 |

\* cited by examiner

VEHICLE HOOD HINGE

CROSS-REFERENCE TO RELATED APPLICATION

This application claims the benefit of priority to Japanese Patent Application No. 2022-042940 filed on Mar. 17, 2022, the disclosures of all of which are hereby incorporated by reference in their entireties.

TECHNICAL FIELD

The present invention relates to a vehicle hood hinge to allow a hood to be normally opened or popped up.

BACKGROUND OF THE INVENTION

Japanese Patent Application Publication No. 2021-154863 (hereinbelow, referred to as Patent Document 1) discloses a structure, as a vehicle hood hinge, to cause a hood to be wholly lifted. When the hood is lifted, the structure causes a claw portion of a link member to be inserted into a hole of a first member located, along with a lower hinge, below the link member, to restrict the link member from being pivoted, to hold the hood at a predetermined height.

SUMMARY

Problems to be Solved

The structure of Patent Document 1 requires the claw portion, erected in a vehicle width direction from the link member, to enter into the hole formed to penetrate the first member along the vehicle width direction, and this behavior is desired to be improved.

The present invention has been devised in view of the above-identified point and is intended to provide a vehicle hood hinge allowing for simply and suitably keeping a hood lifted.

Solution to Problem

A vehicle hood hinge of the present invention to solve the above-identified problem includes: a lower hinge configured to be fixed to a vehicle body; an upper hinge configured to be fixed to, and supported by, a hood so as to be movable relative to the lower hinge, the hood being configured to open or close an opening formed in an upper surface of the vehicle body; a link mechanism linking the lower hinge with the upper hinge; and a load receiver configured to support a load of the hood, wherein the link mechanism is configured to switch between pivoting to cause the hood to be pivoted about an axis through the lower hinge and lifting to lift the hood, and the load receiver is configured to receive, on an upper end surface thereof, the load of the hood lifted through the lifting, to restrict the hood from lowering.

Advantageous Effects of the Invention

The present invention allows for simply and suitably keeping the hood lifted.

DETAILED DESCRIPTION

Hereinafter, a description is given in detail of an embodiment of the present invention, with reference to the drawings as required. Note that "a front-rear direction" in the drawings indicates a vehicle front-rear direction, "a right-left direction" indicates a right-left direction (a vehicle width direction) as viewed from a driver seat, and "an up-down direction" indicates an up-down direction of a vehicle standing still on a horizontal plane.

Figure 1:
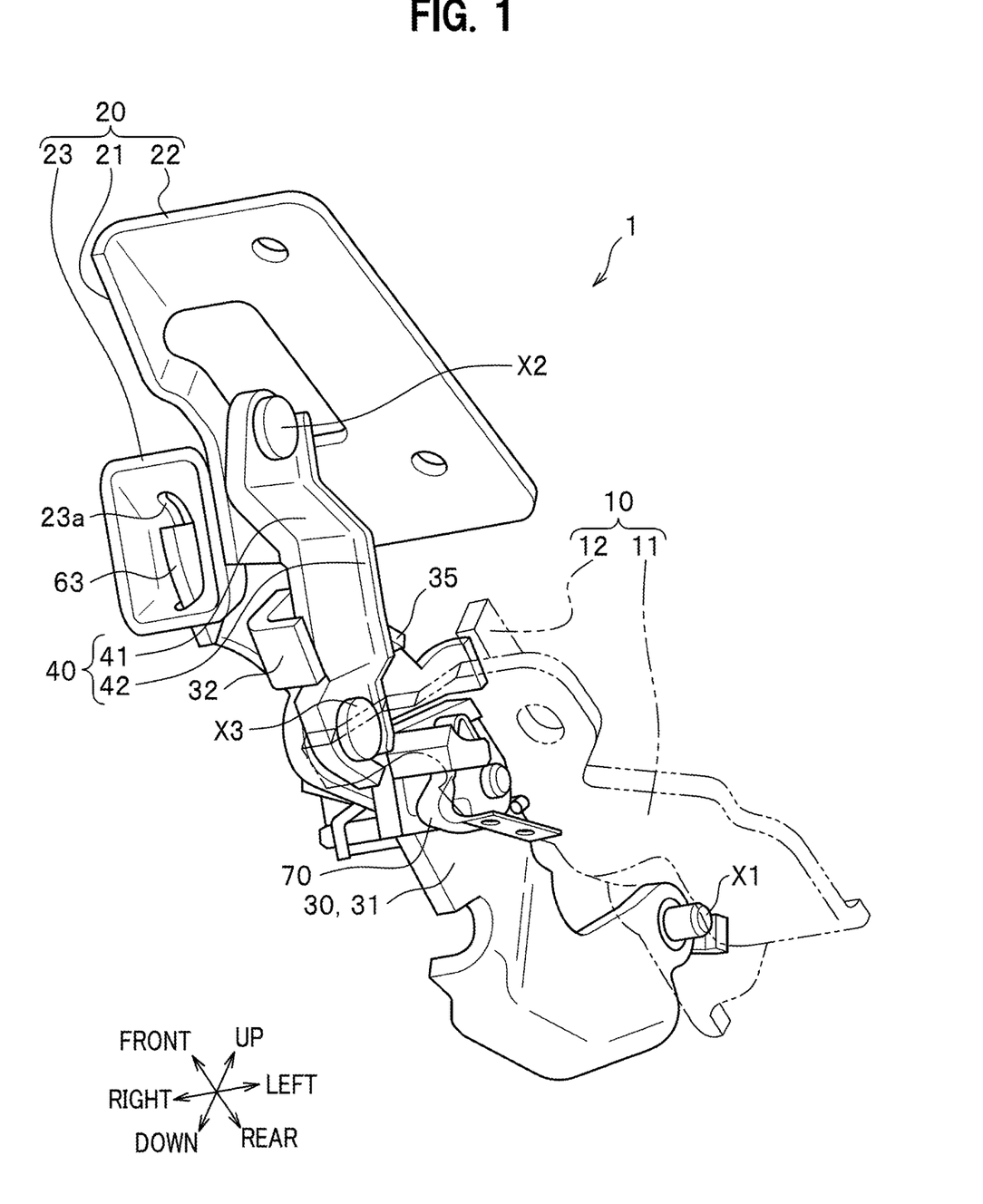
FIG. 1 is a schematic perspective view of a vehicle hood hinge according to an embodiment of the present invention.
Figure 2:
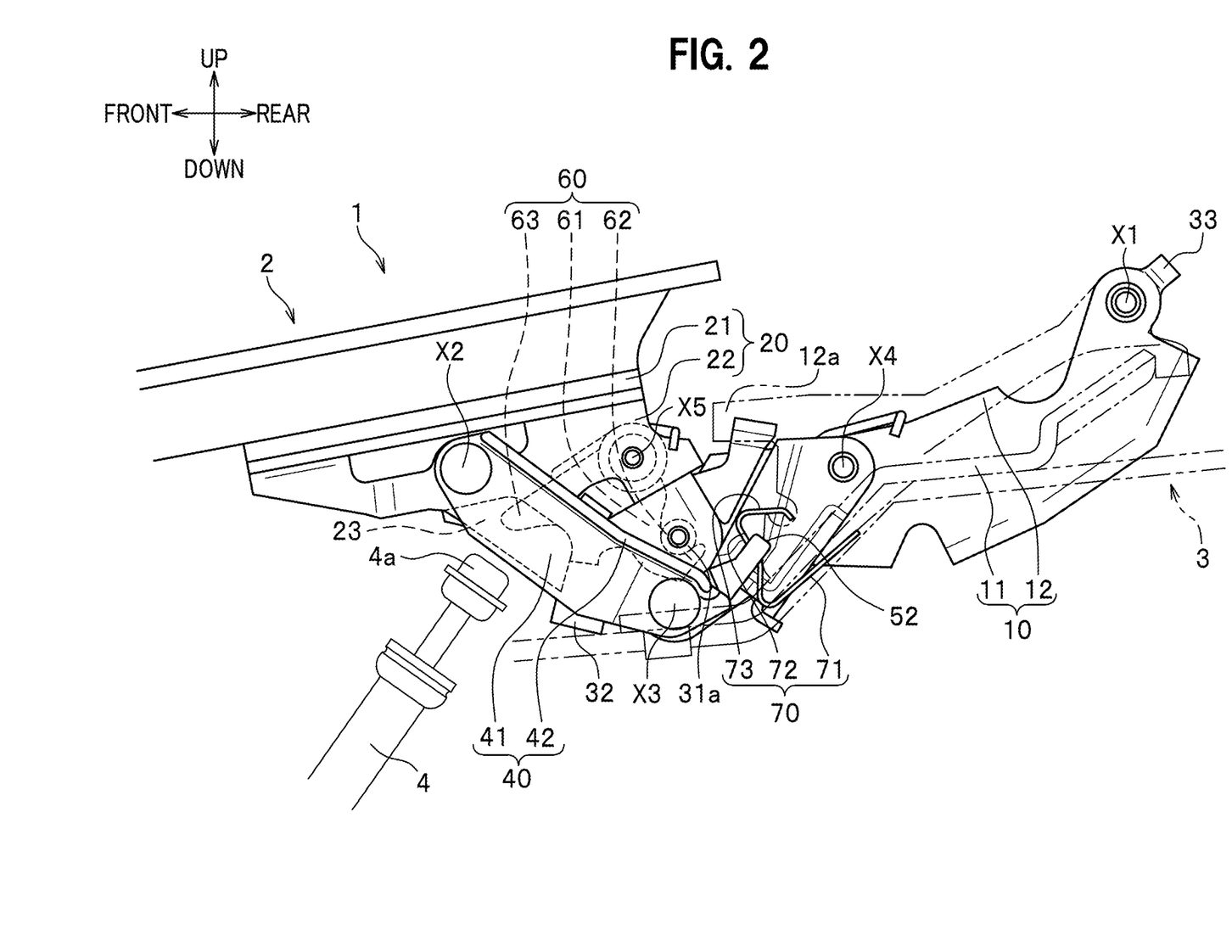
FIG. 2 is a schematic side view of the vehicle hood hinge according to the embodiment of the present invention.
Figure 3:
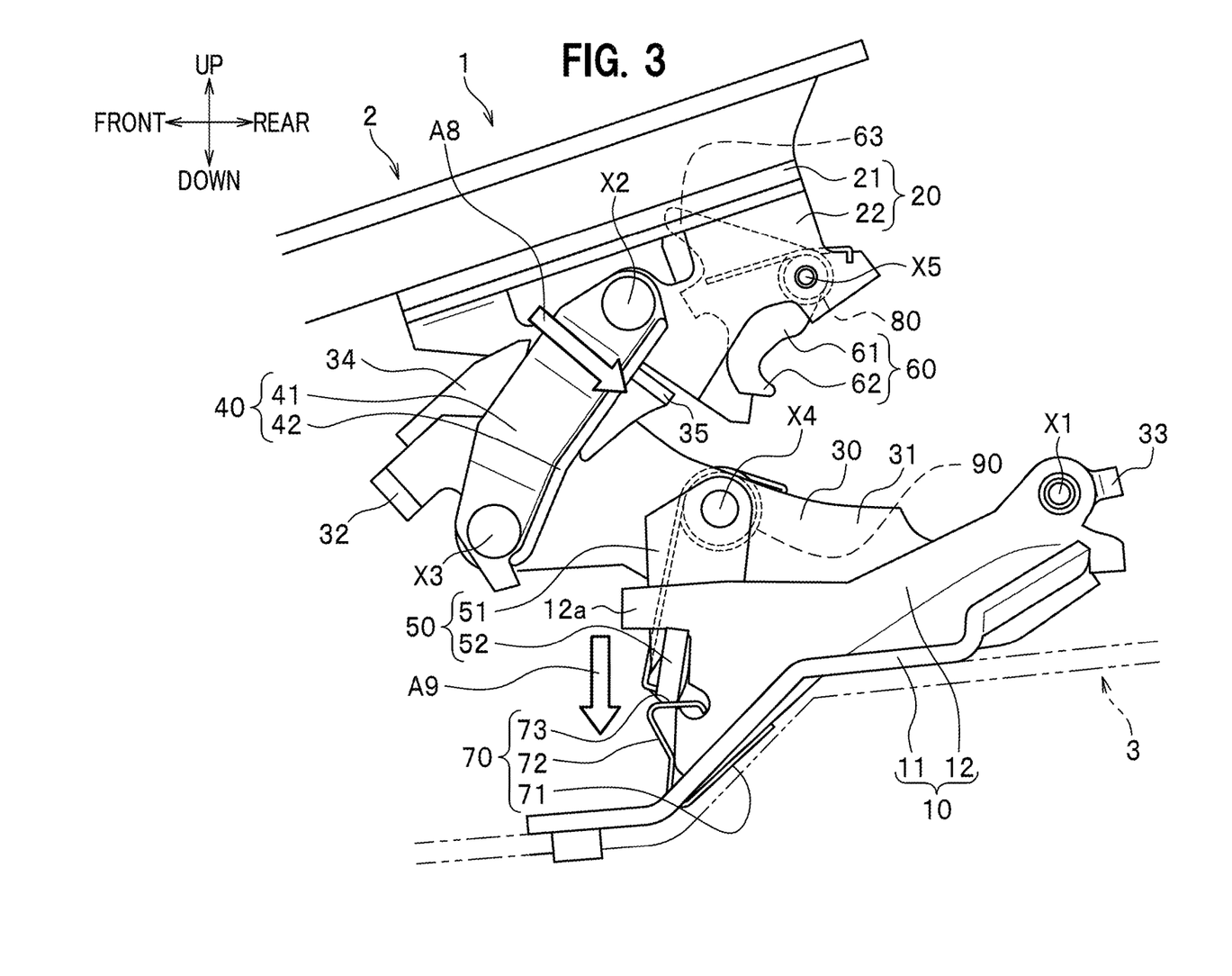
FIG. 3 illustrates exemplary behavior of the vehicle hood hinge according to the embodiment of the present invention, to schematically show an upper link being supported by a first stopper and a detent member being supported by a load receiving member when the hood is lifted.

As shown in FIGS. 1 to 3, a vehicle hood hinge 1 according to the embodiment of the present invention is a member to support one end (here, a rear end) of a hood 2 so as to be opened and closed with respect to a vehicle body (e.g., upper member) 3. The hood 2 is a lid member made of metal or resin for opening and closing an upper opening of a power compartment provided at a front of the vehicle body 3. A pair of the right and left vehicle hood hinges 1 is provided in the present embodiment at both ends in the vehicle width direction of the hood 2, respectively, but the vehicle hood hinge 1 on the right side is taken as an example in the following description and described with a closed state as normal.

The vehicle hood hinge 1 serves as a pivot axis at one end (rear end) of the hood 2 when the hood 2 is normally opened. In addition, the vehicle hood hinge 1 wholly lifts one end (rear end) of the hood 2 upward, when the hood 2 is popped up, by an upward force applied by an actuator 4 provided in the vehicle body 3 longitudinally extending. Note that a vehicle hood latch, not shown, is provided at the other end (front end) of the hood 2. The vehicle hood latch is in an unlocking state, when the hood 2 is normally opened, and the other end (front end) of the hood 2 is lifted upward, while the vehicle hood latch staying in a locking state, when the hood 2 is popped up.

The vehicle hood hinge 1 includes a lower hinge 10, an upper hinge 20, a lower link 30, an upper link 40, a detent member (detent portion) 50, a lock member 60, a load receiving member (load receiving portion, second elastic portion) 70, a first spring 80, and a second spring 90. Here, the lower link 30, the upper link 40, the detent member 50, and the lock member 60 constitute a link mechanism linking the lower hinge 10 with the upper hinge 20. Such a link mechanism is configured to cause the hood 2 to be pivoted about a pivot axis X1 of the lower hinge 10, depending on a state of the lock member 60, to switch between pivoting (in connection with locking) to open or close the opening of the vehicle body 3 and lifting ((in connection with popping up or unlocking) to wholly lift the hood 2.

<Lower Hinge>

The lower hinge 10 is a metal member fixed to the vehicle body 3. The lower hinge 10 includes, as a single piece, a bottom wall 11 as an attached portion, and a side wall 12 extending upward from an outer end in the vehicle width direction of a rear portion of the bottom wall 11 and composing a main part of the lower hinge 10.

The bottom wall 11 is fixed to an upper surface of the vehicle body 3 by one or more bolts or the like. The side wall 12 has, at one end (rear end) thereof, the lower link 30 pivotally coupled therewith via the pivot axis X1 extending in the vehicle width direction.

<Stopper (Second Stopper)>

The lower hinge 10 is formed, at an upper end portion of the other end (front end) of the side wall 12, with a stopper (second stopper) 12a extending forward. The stopper 12a restricts a lifting range of the lower link 30 and detent member 50 when the hood 2 is lifted.

<Upper Hinge>

The upper hinge 20 is a metal member fixed to the hood 2. The upper hinge 20 includes, as a single piece, a top wall 21 as an attached portion, a side wall 22 extending downward from an outer end in the vehicle width direction of the top wall 21 and composing a main part of the upper hinge 20, and a cup portion 23 extending outward in the vehicle width direction from the side wall 22.

The top wall 21 is fixed to a bottom surface of the hood 2 by one or more bolts or the like. The side wall 22 has, in the middle in a front-rear direction thereof, the upper link 40 pivotally coupled therewith via a pivot axis X2 extending in the vehicle width direction. The cup portion 23 has a concave shape opening downward. The cup portion 23 is formed, in a concave bottom surface (top surface in the present embodiment) thereof, with a slit 23a.

<Lower Link>

The lower link 30 is a metal member having the lower hinge 10 and the upper hinge 40 pivotally coupled therewith respectively at both ends. The lower link 30 is provided outside in the vehicle width direction of the lower hinge 10, and includes, as a single piece, a side wall 31 composing a main part of the lower link 30, a front wall 32 extending inward in the vehicle width direction from the middle in a height direction of the other end (front end) of the side wall 31, and a rear wall 33 extending inward in the vehicle width direction from one end (rear end) of the side wall 31. In addition, the lower link 30 includes, as a single piece, an elastic portion (first elastic portion) 34 extending inward in the vehicle width direction from a top of the other end (front end) of the side wall 31, and a first stopper 35 extending inward in the vehicle width direction from the middle in the front-rear direction of the side wall 31.

The side wall 31 has, at one end (rear end) thereof, the side wall 12 of the lower hinge 10 pivotally coupled therewith via the pivot axis X1 extending in the vehicle width direction. The side wall 31 has, at a lower portion of the other end (front end) thereof, the upper link 40 pivotally coupled therewith via a pivot axis X3 extending in the vehicle width direction. The side wall 31 is formed with a pin portion 31a extending outward in the vehicle width direction.

<<Elastic Portion (First Elastic Portion)>>

The elastic portion 34 is provided on a traveling route of the upper link 40. At an early phase when the hood 2 is lifted, the elastic portion 34 is elastically deformed by the upper link 40 sliding thereon, to allow the upper link 40 to travel thereover. When the upper link 40 restoring while the hood 2 being lifted, the elastic portion 34 elastically receives the upper link 40 to restrict the upper link 40 from restoring. The elastic portion 34 is a flat spring member including a base portion to be attached to the side wall 31, and a front wall extending inward in the vehicle width direction from the other end (front end) of the base portion.

<<First Stopper>>

The first stopper 35 is provided on a traveling route of the upper link 40. When the hood 2 is lifted, the first stopper 35 abuts the upper link 40, having traveled over the elastic portion 34, to restrict a pivoting range of the upper link 40. When the upper link 40 restoring while the hood 2 being lifted, the first stopper 35 receives a load of the lowering upper link 40 to support the upper link 40.

<Upper Link>

The upper link 40 is a metal member having the upper hinge 20 and the lower link 30 coupled therewith respectively at both ends. The upper link 40 is provided inside in the vehicle width direction of the upper hinge 20 and the lower link 30, and includes, as a single piece, a side wall 41 composing a main part of the upper link 40, and a top wall 42 extending inward in the vehicle width direction from a top end of the side wall 41.

The side wall 41 has, at one end (rear end) thereof, the upper hinge 20 pivotally coupled therewith via the pivot axis X2 extending in the vehicle width direction. The side wall 41 has, at the other end (front end) thereof, the lower link 30 pivotally coupled therewith via the pivot axis X3 extending in the vehicle width direction.

<Detent Member (Detent Portion)>

The detent member 50 is a metal member lowered at a later phase when the hood 2 is lifted, to abut on, and to be supported by, an upper end surface of the load receiving member 70. The detent member 50 is provided inside in the vehicle width direction of the lower link 30 and includes, as a single piece, a side wall 51 composing a main part of the detent member 50, and a bottom wall 52 extending inward in the vehicle width direction from a lower end of the side wall 51. The bottom wall 52 in the present embodiment has a groove shape to house the stopper 12a.

The side wall 51 has, at the upper end thereof, a middle portion in the front-rear direction of the lower link 30 pivotally coupled therewith via a pivot axis X4 extending in the vehicle width direction.

<Lock Member>

The lock member 60 is a metal member pivotally supported by the upper hinge 20. The lock member 60 is a member to switch between a locking state (allowing the hood 2 to be pivoted) of engaging with the lower link 30 to have the link mechanism locked and an unlocking state (allowing the hood 2 to be lifted) of having been disengaged from the lower link 30 to have the link mechanism unlocked. The lock member 60 is provided outside in the vehicle width direction of the upper hinge 20 and includes, as a single piece, a side wall 61 composing a main part of the lock member 60, an engaging claw 62 extending radially outward from a circumferential surface of the side wall 61, and a projection 63.

The side wall 61 has the side wall 22 of the upper hinge 20 pivotally coupled therewith via a pivot axis 5 extending in the vehicle width direction. The engaging claw 62 has an arc shape engageable with the pin portion 31a of the lower link 30. The projection 63 has a shape insertable into the slit 23a in the cup portion 23.

<Load Receiving Member>

The load receiving member 70 is a flat spring member to receive a load of the hood 2 after the hood 2 has been lifted, to restrict the hood 2 from lowering. The load receiving member 70 includes, as a single piece, a base 71 to be attached to the lower hinge 10, an up-down side 72 extending upward from the other end (front end) of the base 71, and a front-rear side (upper end surface) 73 extending rearward from an upper end of the up-down side 72. The up-down side 72 is a portion on which a lower wall 52 of the detent member 50 slides at an early phase when the hood 2 is lifted, and has a tilting shape tilting more frontward toward the top. The front-rear side 73 is a portion which abuts and supports the lowering detent member 50 at a later phase when the hood 2 is lifted.

<First Spring>

The first spring 80 is a tension spring to bias the lock member 60 toward a position for the locking state. A body portion of the first spring 80 is set onto a pivot axis X5, and a leg of the first spring 80 is attached to an radially-outer end (projection 63, for example) of the lock member 60.

<Second Spring>

The second spring 90 is a tension spring to bias the detent member 50 toward the lower hinge 10. A body portion of the second spring 90 is set onto the pivot axis X4, and a leg of the second spring 90 is attached to a lower end of the detent member 50.

<Exemplary Behaviors>

Next, exemplary behaviors of the vehicle hood hinge 1 are described in the following order: closed; normally opened; and popped up.

<Closed>

When the vehicle hood hinge 1 is closed, the front wall 32 of the lower link 30 is placed on the vehicle body 3, as shown in FIG. 2. In addition, the side wall 41 of the upper link 40 is placed on the front wall 32. Further, the engaging claw 62 of the lock member 60 is engaged with the pin portion 31a of the lower link 30 by a biasing force of the first spring 80. This engagement causes the lower link 30 to be locked (locking state) so as to be immovable relative to the upper hinge 20. In the locking state, the upper hinge 20, lower link 30, and upper link 40 are supported, as an integrated assembly, by the lower hinge 10 so as to be pivotable about the pivot axis X1. Additionally, the projection 63 of the lock member 60 is inserted from above into the slit 23a of the cup portion 23 of the upper hinge 20 and positioned inside the concave portion of the cup portion 23.

<Normally Opened>

Figure 4:
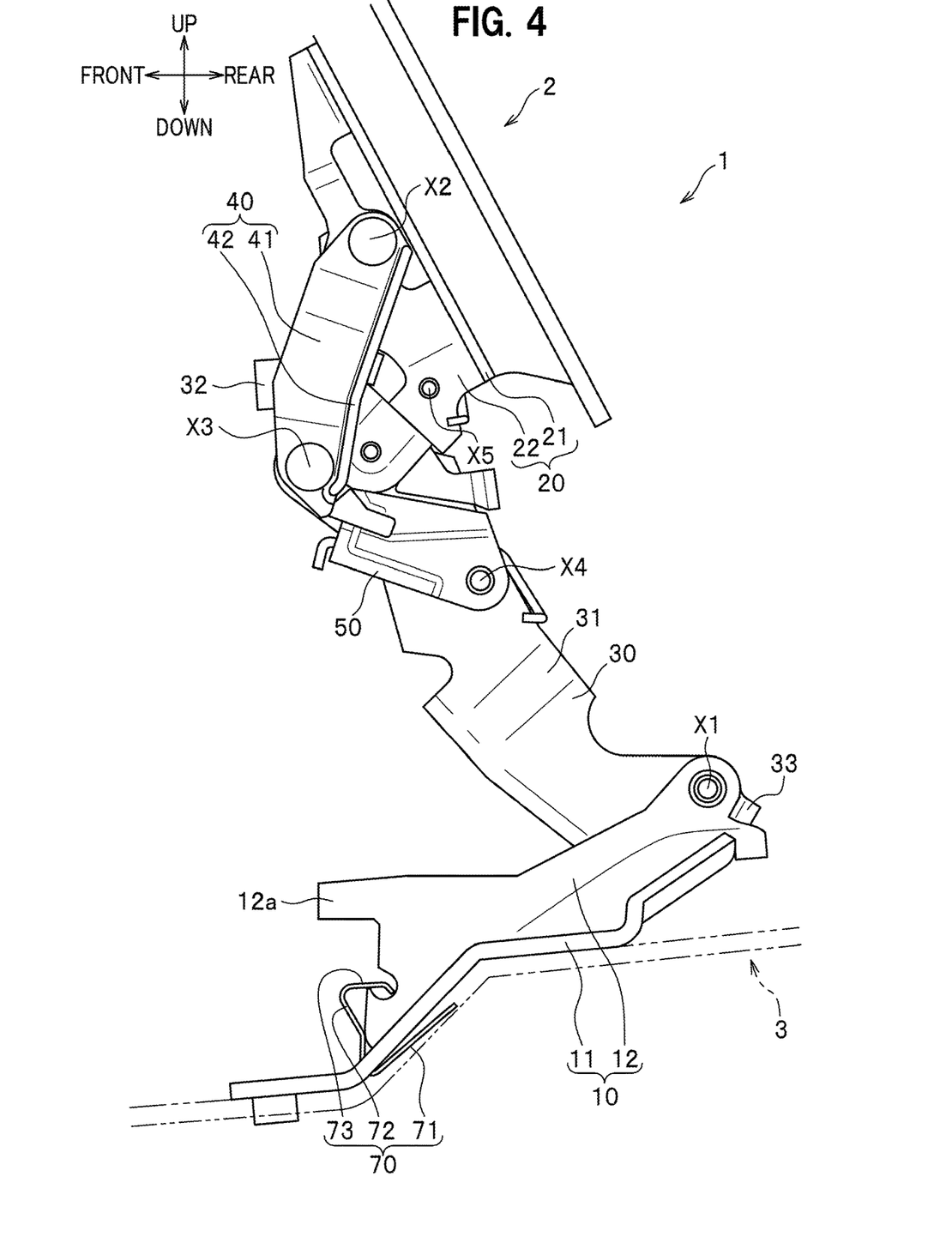
FIG. 4 illustrates exemplary behavior of the vehicle hood hinge according to the embodiment of the present invention, and is a schematic side view of the hood opened through pivoting of the hood.

When the hood 2 is normally opened, the other end (front end) of the hood 2 is lifted upward by a worker, as shown in FIG. 4. Here, the upper hinge 20, lower link 30, and upper link 40 are pivoted in an opening direction about the pivot axis X1 with respect to the lower hinge 10. That is, the hood 2 is configured to be opened or closed with one end (rear end) thereof working as the pivot axis X1. A pivoting range of the hood 2 is restricted by the real wall 33 of the lower link 30 abutting the upper end portion of the side wall 12 of the lower hinge 10.

<Popped up>

Figure 5:
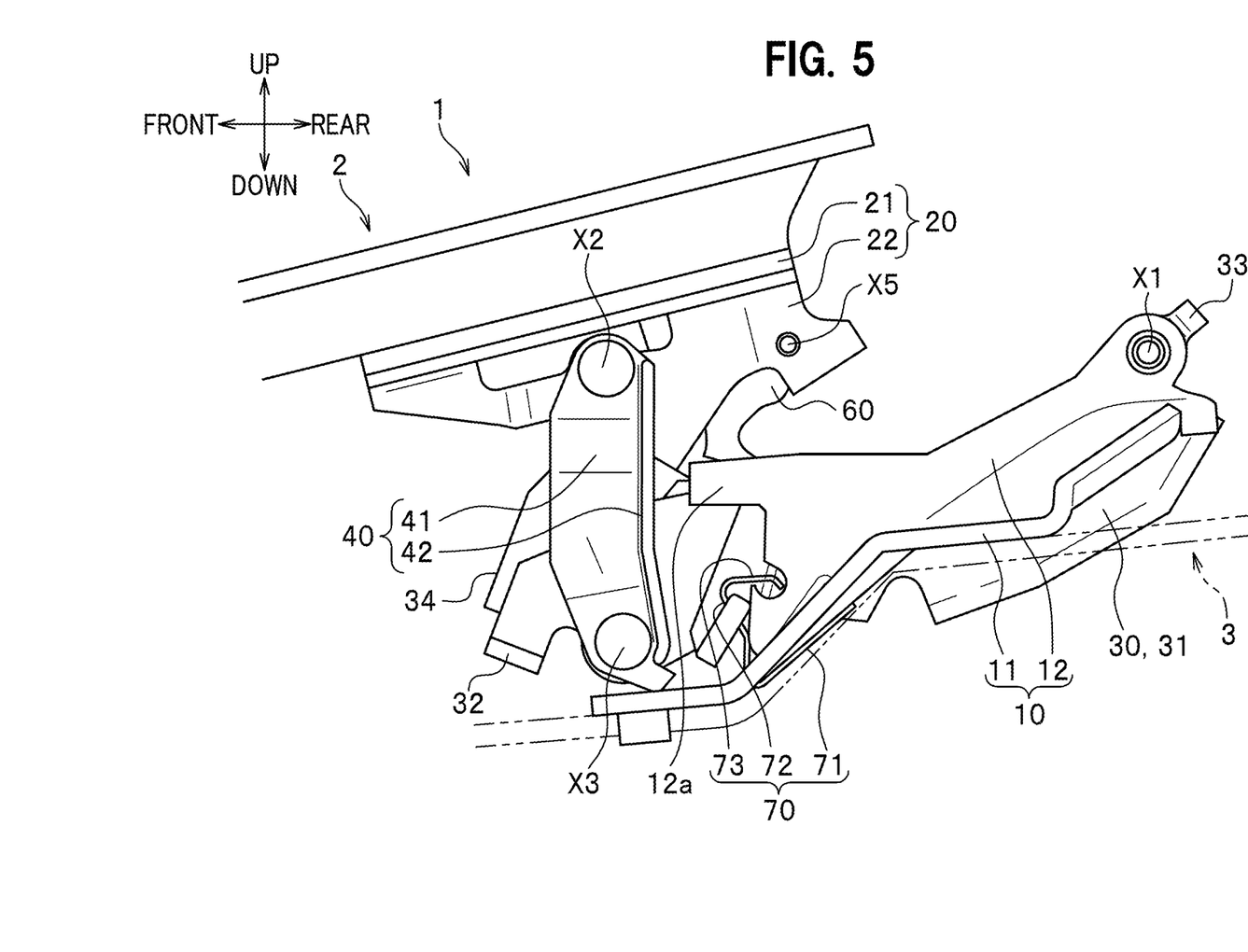
FIG. 5 illustrates exemplary behavior of the vehicle hood hinge according to the embodiment of the present invention, and is a schematic side view of a near-pivot-axis-X2 end of the upper link being lifted when the hood is lifted.

When the hood 2 is popped up, a distal end 4a of the actuator 4 pushes the projection 63 of the lock member 60 from below and pushes the cup portion 23 of the upper hinge 20 from below, as shown in FIG. 2. Here, the lock member 60 is pivoted in an unlocking direction against the biasing force of the first spring 80. This causes the engaging claw 62 to be disengaged from the pin portion 31a to wholly lift the upper hinge 20 by way of the related members pivoting about the pivot axes X2, X3 and the related members pivoting about the pivot axis X1 (see FIG. 5). When the hood 2 is lifted, the distal end 4a of the actuator 4 abuts the cup portion 23 and pushes the cup portion 23 until halfway of the lifting (until the upper link 40 starts restoring). The related members are then lifted by an inertial force due to a pushing force of the actuator 4.

Figure 6:
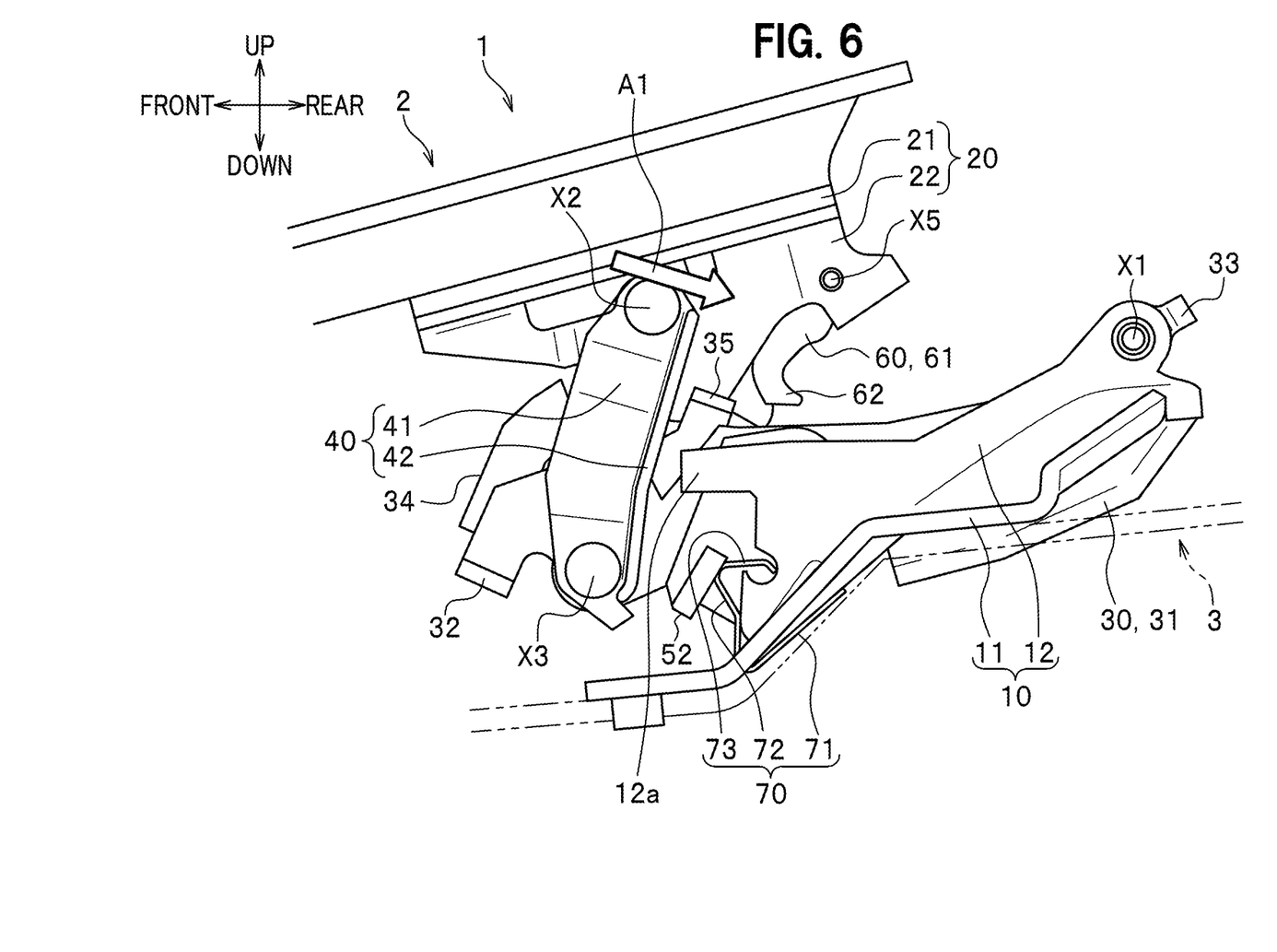
FIG. 6 illustrates exemplary behavior of the vehicle hood hinge according to the embodiment of the present invention, and is a schematic side view of the near-pivot-axis-X2 end of the upper link lowering when the hood is lifted.
Figure 7:
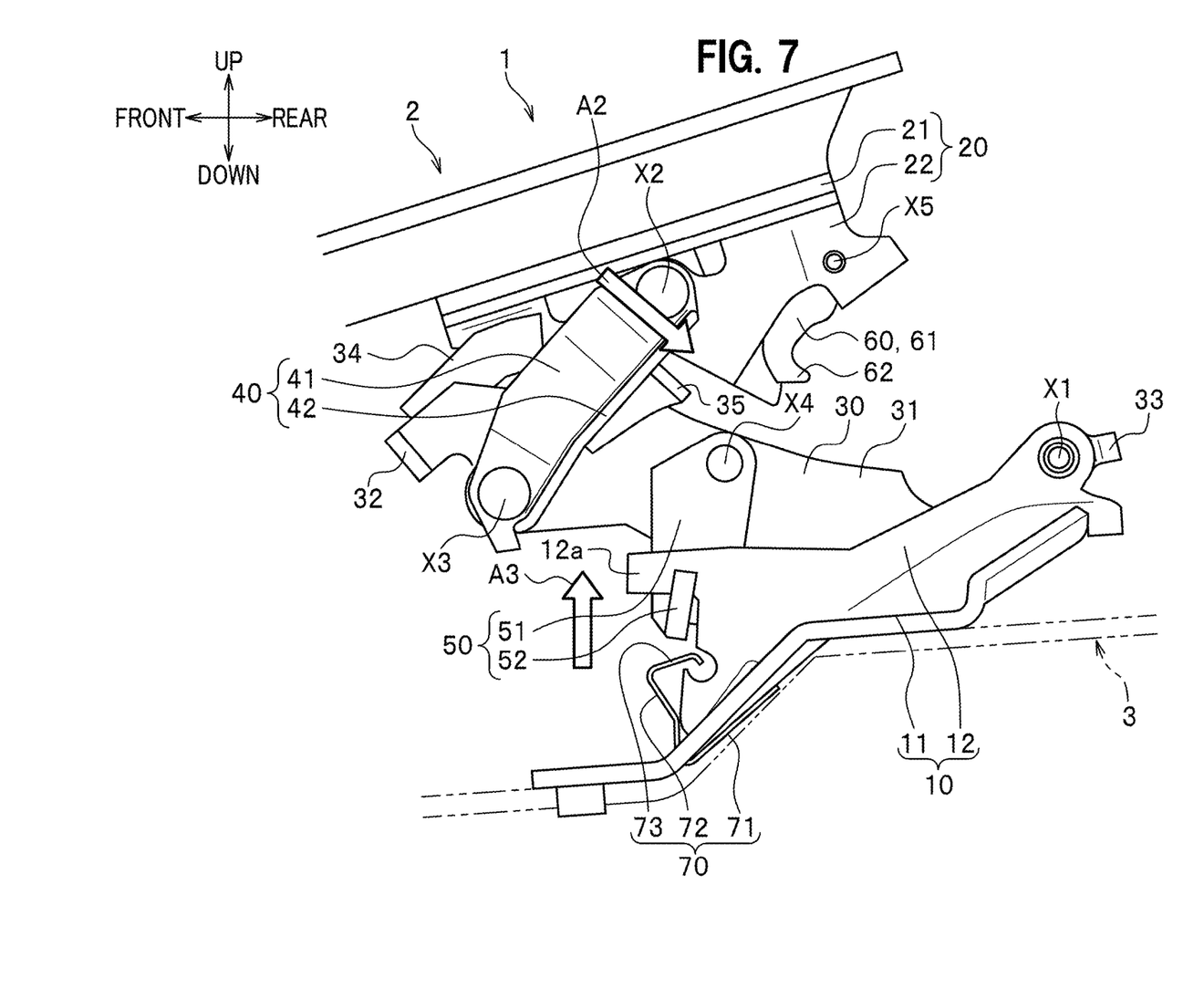
FIG. 7 illustrates exemplary behavior of the vehicle hood hinge according to the embodiment of the present invention, and is a schematic side view of the upper link contacting the first stopper and the detent member contacting a second stopper when the hood is lifted.

Here, the upper link 40 is pivoted about the pivot axis X3 (see an arrow A1 in FIG. 6 and an arrow A2 in FIG. 7) so that a near-pivot-axis-X2 end thereof is moved upward and rearward, travels over the elastic portion 34, and has the top wall 42 abutting the first stopper 35 (see FIGS. 6 and 7). The elastic portion 34 is elastically deformed by the upper link 40 sliding thereon to allow the upper link 40 to travel thereover. The elastic portion 34 restores to the original form after the upper link 40 has traveled.

Figure 8:
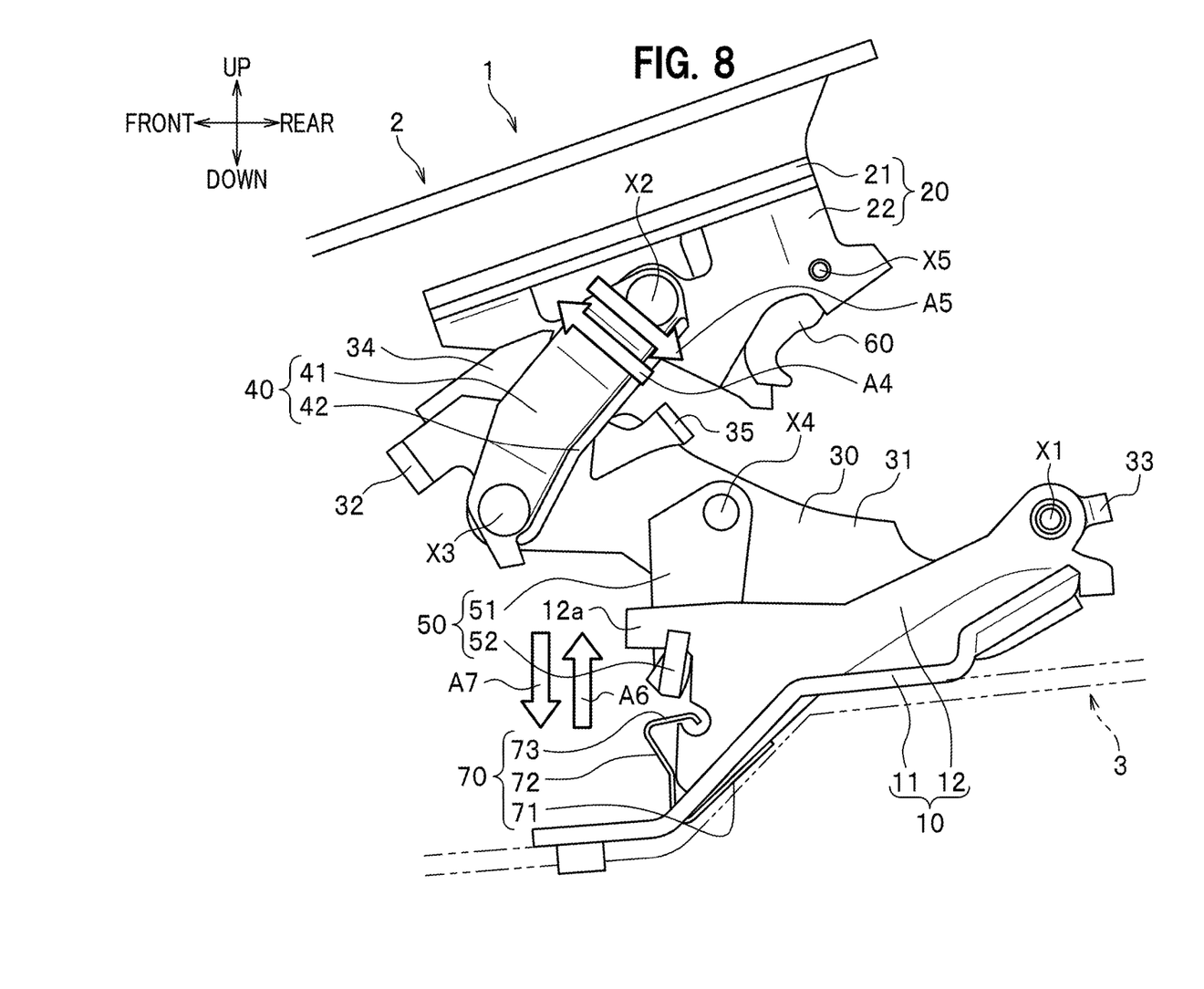
FIG. 8 illustrates exemplary behavior of the vehicle hood hinge according to the embodiment of the present invention, and is a schematic side view of the upper link and lower link restoring when the hood is lifted.

On another front, the detent member 50 is lifted against a biasing force of the second spring 90, in accordance with the lower link 30 pivoting about the pivot axis X1 (see an arrow A3 in FIG. 7 and an arrow A6 in FIG. 8). Here, the bottom wall 52 of the detent member 50 slides on the up-down side 72 of the load receiving member 70 by the biasing force of the second spring 90. The up-down side 72 of the load receiving member 70 is elastically deformed rearward by the bottom wall 52 of the detent member 50 sliding thereon, to allow the bottom wall 52 of the detent member 50 to travel thereover (see FIG. 6). The load receiving member 70 restores to original form after the bottom wall 52 has traveled. The detent member 50 is then lifted against the biasing force of the second spring 90, with the bottom wall 52 sliding on a front end surface of the lower hinge 10 by the biasing force of the second spring 90. The lifting causes the bottom wall 52 of the detent member 50 to abut the stopper 12a of the lower hinge 10. This restricts the lower link 30 from pivoting about the pivot axis X1 (see FIG. 7).

The upper link 40 is then pivoted about the pivot axis X3 (see an arrow A4 in FIG. 8) by reaction of having abutted the first stopper 35 and an inertial force of the lower link 30 having been restricted from pivoting, so that the near-pivot-axis-X2 end is moved frontward (see an arrow A4 in FIG. 8), and abuts the elastic portion 34 (see FIG. 8).

The upper link 40 is then pivoted about the pivot axis X3 (see an arrow A5 in FIG. 8 and an arrow A8 in FIG. 3) by reaction of having abutted the elastic portion 34, so that the near-pivot-axis-X2 end is moved rearward and downward, and abuts on, and is supported by, the first stopper 35 (see FIG. 3). That is, the upper link 40 is positioned between the elastic portion 34 and the first stopper 35, after the hood 2 has been lifted.

On another front, the lower link 30 is pivoted about the pivot axis X1 so as to be moved downward by gravity (see an arrow A7 in FIG. 8 and an arrow A9 in FIG. 3). The bottom wall 52 of the detent member 50 then abuts the front-rear side 73 of the load receiving member 70. This causes the load receiving member 70 to restrict the lower link 30 from being pivoted about the pivot axis X1 and support loads of the hood 2 and so on, while being elastically deformed (see FIG. 3).

The vehicle hood hinge 1 according to the embodiment of the present invention includes: the lower hinge 10 configured to be fixed to the vehicle body 3; the upper hinge 20 configured to be fixed to, and supported by, the hood 2 so as to be movable relative to the lower hinge 10, the hood 2 being configured to open or close an opening formed in an upper surface of the vehicle body 3; a link mechanism linking the lower hinge 10 with the upper hinge 20; and the load receiver (load receiving member 70) configured to support a load of the hood 2, wherein the link mechanism is configured to switch between pivoting to cause the hood 2 to be pivoted about the axis through the lower hinge 10 and lifting to lift the hood 2, and the load receiver is configured to receive, on an upper end surface (front-rear side 73) thereof, the load of the hood 2 lifted through the lifting, to restrict the hood 2 from lowering. Accordingly, the vehicle hood hinge 1 allows for simply and suitably keeping the hood 2 lifted, as compared with a case of keeping the hood 2 at a lifted position (restricting the hood 2 from lowering) by engaging, in the vehicle width direction, a concave portion (hole) with a convex portion. In addition, the hood 2 has no need to keep being pushed by the actuator 4 to the lifted position and is instead lifted by an inertial force, so that a stroke amount of the actuator 4 is reduced to allow for reducing an amount of gunpowder for activating the actuator 4 and reducing the actuator 4 in weight.

In the vehicle hood hinge 1, the load receiver is a spring to elastically receive a load of the hood 2. Accordingly, the vehicle hood hinge 1 prevents a load applied to the hood 2 and the vehicle hood hinge 1 from locally increasing, as compared with a case of a detent portion plastically receiving a load of the hood 2, to allow for reducing the vehicle hood hinge 1, including the load receiver, in size. Additionally, the vehicle hood hinge 1 allows for reducing a reaction force to an object colliding with the hood 2, to protect the object.

In the vehicle hood hinge 1, the link mechanism includes the lower link 30 coupled with the lower hinge 10, and the upper link 40 coupled with the lower link 30 and upper hinge 20, wherein the lower link 30 includes the first stopper 35 to restrict a pivoting range of the upper link 40 with respect to the lower link 30, when the hood 2 is lifted. Accordingly, the vehicle hood hinge 1 prevents excessive pivoting of the upper link 40, to effect suitable lifting of the hood 2.

In the vehicle hood hinge 1, the link mechanism includes the detent portion (detent member 50) to abut the top surface of the load receiver, and the lower hinge 10 includes the second stopper 12a to restrict a lifting range of the detent portion, when the hood 2 is lifted. Accordingly, the vehicle hood hinge 1 prevents excessive lifting of the hood 2, to effect suitable lifting of the hood 2

The vehicle hood hinge 1 includes the lock member 60 pivotally supported by the upper hinge 20 and configured to switch between the locking state of engaging with the link mechanism to have the link mechanism locked and the unlocking state of having been disengaged from the link mechanism to have the link mechanism unlocked, and the first spring 80 biasing the lock member 60 toward a position for the locking state. Accordingly, the vehicle hood hinge 1 suitably keeps the link mechanism locked in normal times and unlocks the lock member 60 without plastic deformation, when the hood 2 is lifted, to effect stable unlocking. Additionally, the vehicle hood hinge 1 stabilizes position of the lock member 60 after the unlocking.

The vehicle hood hinge 1 includes the second spring 90 to bias the detent portion toward the lower hinge 10. Accordingly, the vehicle hood hinge 1 has the detent portion, receiving the load of the hood 2 by the load receiver, positionally secured by the second spring 90, to suitably keep the hood 2 at the lifted position.

In the vehicle hood hinge 1, the link mechanism includes the lower link 30 coupled with the lower hinge 10, and the upper link 40 coupled with the lower link 30 and upper hinge 20, and the second spring 90 gives a resistive force to the lower link 30 when the hood 2 is lifted. Accordingly, the vehicle hood hinge 1 reduces a load of lifting the hood 2 by the second spring 90 when the hood 2 is lifted, to prevent moving parts from being damaged.

In the vehicle hood hinge 1, the link mechanism includes the detent portion (detent member 50) to abut the top surface of the load receiver, and the load receiver is provided so as to have the detent portion slidable thereon when the hood 2 is lifted. Accordingly, the vehicle hood hinge 1 reduces a load of lifting the hood 2 by the load receiver when the hood 2 is lifted, to prevent moving parts from being damaged.

The vehicle hood hinge 1 includes the lock member 60 pivotally supported by the upper hinge 20 and configured to switch between the locking state of engaging with the link mechanism to have the link mechanism locked and the unlocking state of having been disengaged from the link mechanism to have the link mechanism unlocked, wherein the upper hinge 20 has the cup portion 23 pushed by the actuator 4, and the lock member 60 has the projection 63 to be inserted into the slot 23a formed in the cup portion 23 so as to be positioned inside the cup portion 23, and to be pushed by the actuator 4. Accordingly, the vehicle hood hinge 1 is configured to have the projection 63 inside the cup portion 23 suitably pushed to suitably unlock the locking of the link mechanism by the lock member 60.

Hereinabove, the embodiment of the present invention has been described, but the present invention is not limited thereto and can be modified as required within the scope thereof.

LIST OF REFERENCE SIGNS

1: vehicle hood hinge, 2: hood, 3: vehicle body, 4: actuator, 10: lower hinge, 12a: stopper (second stopper), 20: upper hinge, 23: cup portion, 23a: slit, 30: lower link, 34: elastic portion (first elastic portion), 35: stopper (first stopper), 40: upper link, 50: detent member (detent portion, second elastic portion), 60: locking member, 70: load receiving member (load receiver), 73: front-rear side (top surface), 80: first spring, and 90: second spring.

What is claimed is:
1. A vehicle hood hinge comprising:
a lower hinge configured to be fixed to a vehicle body;
an upper hinge configured to be fixed to, and supported by, a hood so as to be movable relative to the lower hinge, the hood being configured to open or close an opening formed in an upper surface of the vehicle body;
a link mechanism linking the lower hinge with the upper hinge; and
a load receiver configured to support a load of the hood, wherein the link mechanism is configured to switch between pivoting to cause the hood to be pivoted about an axis through the lower hinge and lifting to lift the hood, and
the load receiver is configured to receive, on an upper end surface thereof, the load of the hood lifted through the lifting, to restrict the hood from lowering.

2. The vehicle hood hinge according to claim 1, wherein the load receiver is a spring to elastically receive a load of the hood.

3. The vehicle hood hinge according to claim 2, wherein the link mechanism includes a detent portion to abut the top surface of the load receiver, and
the load receiver is provided so as to have the detent portion slidable thereon during the lifting.

4. The vehicle hood hinge according to claim 1, wherein the link mechanism includes:
a lower link coupled with the lower hinge; and
an upper link coupled with the lower link and upper hinge,
wherein the lower link includes a first stopper to restrict a pivoting range of the upper link with respect to the lower link, during the lifting.

5. The vehicle hood hinge according to claim 4, wherein the link mechanism includes a detent portion to abut a top surface of the load receiver, and
the lower hinge includes a second stopper to restrict a lifting range of the detent portion, during the lifting.

6. The vehicle hood hinge according to claim 5, further comprising:
a second spring to bias the detent portion toward the lower hinge.

7. The vehicle hood hinge according to claim 6, wherein the link mechanism includes:
a lower link coupled with the lower hinge; and
an upper link coupled with the lower link and upper hinge,
wherein the second spring gives a resistive force to the lower link during the lifting.

8. The vehicle hood hinge according to claim 1, further comprising:
a lock member pivotally supported by the upper hinge and configured to switch between a locking state of engaging with the link mechanism to have the link mechanism locked and an unlocking state of having been disengaged from the link mechanism to have the link mechanism unlocked; and
a first spring biasing the lock member toward a position for the locking state.

9. The vehicle hood hinge according to claim 1, further comprising:
a lock member pivotally supported by the upper hinge and configured to switch between a locking state of engaging with the link mechanism to have the link mechanism locked and an unlocking state of having been disengaged from the link mechanism to have the link mechanism unlocked,
wherein
the upper hinge a cup portion pushed by the actuator, and
the lock member has a projection to be inserted into a slot formed in the cup portion so as to be positioned inside the cup portion, and to be pushed by the actuator.

* * * * *